(12) United States Patent
Bardelli et al.

(10) Patent No.: US 8,007,906 B2
(45) Date of Patent: Aug. 30, 2011

(54) COATING OF ORGANIC AND INORGANIC PIGMENTS WITH ALDEHYDE OR KETONE RESINS

(75) Inventors: Angelo Achille Bardelli, Buguggiate, VA (US); Giorgio Ribaldone, Bullarate, VA (US)

(73) Assignee: Inxel Trademark & Patents SAGL, Lugano (CH)

( * ) Notice: Subject to any disclaimer, the term of this patent is extended or adjusted under 35 U.S.C. 154(b) by 0 days.

(21) Appl. No.: 11/815,716

(22) PCT Filed: Jul. 26, 2005

(86) PCT No.: PCT/IT2005/000443
§ 371 (c)(1),
(2), (4) Date: Nov. 20, 2007

(87) PCT Pub. No.: WO2006/082603
PCT Pub. Date: Aug. 10, 2006

(65) Prior Publication Data
US 2008/0206568 A1  Aug. 28, 2008

(30) Foreign Application Priority Data

Feb. 7, 2005 (IT) .............................. MI2005A0169
Jul. 8, 2005 (IT) .............................. MI2005A1302

(51) Int. Cl.
*B32B 5/66* (2006.01)
(52) U.S. Cl. ........ 428/403; 428/404; 428/405; 428/406; 428/407; 427/212
(58) Field of Classification Search .......... 428/403–407; 427/212
See application file for complete search history.

(56) References Cited

U.S. PATENT DOCUMENTS

| | | | |
|---|---|---|---|
| 2,913,348 A | | 11/1959 | Jackson |
| 3,112,289 A | * | 11/1963 | Stocker .................. 523/455 |
| 3,849,150 A | * | 11/1974 | Schrempp et al. .......... 106/410 |
| 4,049,615 A | * | 9/1977 | Elsener et al. ................ 523/208 |
| 4,464,203 A | | 8/1984 | Belde et al. |
| 4,664,711 A | * | 5/1987 | Kawaguchi et al. ........ 524/399 |
| 5,182,324 A | | 1/1993 | Osada et al. |
| 5,411,802 A | | 5/1995 | Kumar et al. |
| 6,734,231 B2 | | 5/2004 | Creusen et al. |
| 2004/0022749 A1 | | 2/2004 | Malnou |

FOREIGN PATENT DOCUMENTS

| | | |
|---|---|---|
| DE | 4200459 A1 | 7/1992 |
| DE | 19813394 A1 | 9/1999 |
| EP | 0425439 A2 | 5/1991 |
| EP | 0432480 A2 | 6/1991 |
| EP | 1118645 A | 7/2001 |
| EP | 1566419 A | 8/2005 |
| GB | 1 224 627 A | 3/1971 |
| GB | 1588777 A | 4/1981 |
| JP | 1174591 A | 7/1989 |
| WO | 9928390 A | 6/1999 |
| WO | 0001774 A1 | 1/2000 |
| WO | 0121371 A1 | 3/2001 |
| WO | 2004/074382 A2 * | 2/2003 |
| WO | WO2004/074382 A2 * | 2/2003 |
| WO | 03080742 A1 | 10/2003 |
| WO | 2004074382 A2 | 9/2004 |
| WO | 2004078852 A1 | 9/2004 |
| WO | 2005054381 A1 | 6/2005 |
| WO | 2005080514 A1 | 9/2005 |
| WO | 2006082603 A1 | 8/2006 |
| WO | 2007007359 A1 | 1/2007 |
| WO | 2007080612 A1 | 7/2007 |
| WO | 2008012848 A1 | 1/2008 |

OTHER PUBLICATIONS

"PCT International Search Report dated May 11, 2006 for PCT/IT2005/000443, from which the instant application is based," 3 pgs.
"PCT Written Opinion dated May 11, 2006 for PCT/IT2005/000443, from which the instant application is based," 5 pgs.
"PCT International Preliminary Report on Patentability dated Aug. 7, 2007 for PCT/IT2005/000443, from which the instant application is based," 6 pgs.

* cited by examiner

*Primary Examiner* — Leszek Kiliman
(74) *Attorney, Agent, or Firm* — Fredrikson & Byron, PA

(57) ABSTRACT

Coating of organic and inorganic pigments with aldehyde or ketone resins, comprising a chemical compound consisting of particles of solid organic and inorganic substances, both defined as pigments, in that they are substances which absorb a fraction of the light and reflect the complementary part thereof, coated with aldehyde or ketone resins. The latter are deposited on the surface of the pigment by means of a process which envisages melting of the resin, consequent wetting and coating of the entire surface of the pigment with the resin in the melted state, the consequent cooling and subsequent step of atomization by means of mechanical systems operating in temperature conditions lower than 10° C., by means of cryogenic processes. The product resulting from this invention will be used as a semifinished product for the coloring and pigmentation of powder paints and plastics as a monochromatic coloring material and or will also be used, after dissolving in a solvent, as a pigmented paste in the liquid paints industry.

40 Claims, 3 Drawing Sheets

MIXING

EXTRUSION    DRAWING AND    DRYING    BOXING
             GRANULATION

COATING OF ORGANIC AND INORGANIC PIGMENTS WITH ALDEHYDE OR KETONE RESINS

RELATED APPLICATIONS

This application claims priority to International Application No. PCT/IT2005/000443filed Jul. 26, 2005, Italian Application No. MI2005A001302 filed Jul. 8, 2005, and to Italian Application No. MI2005A00169 filed Feb. 7, 2005, the teachings of all of which are incorporated herein by reference.

The present invention relates to a coating of organic and inorganic pigments with aldehyde or ketone resins, preferably in the form of granules, and also relates to the associated production process.

As is known, pigments are solids of both an organic and inorganic nature, which are defined as such when they are used within a fixing system such as resins and absorb part of the light and reflect the complementary part thereof which forms the colour of the surface coated with this system.

As such, they are solids with a very irregular surface, which differs from compound to compound, and with properties for interfacing with other substances which are completely different from each other and are greatly influenced by the physical and chemical conditions of the contact elements.

The difficulties of incorporating pigments in vehicle systems based on a wide range of resins are well known.

This is true both in the case of powder systems, where contact of the pigment occurs with a polymer resin in the melted state inside an extruder, and in the case of liquid systems where interfacing occurs with resins diluted with solvents which have a flocculating effect on the system.

At present in powder paint formulations the introduction of the pigments is performed by means of simple physical mixing of the pigments with differently shaped granules of the resins which form the vehicle, with the addition of chemical compounds able to improve the contact between pigment and resin and able to incorporate the pigment into the resin during the extrusion stage.

In order to facilitate metering of the colouring pigment, in many cases the latter is mixed with inert pigments in order to dilute the concentration and reduce the risk of metering difficulties in the case of small quantities.

The chemical compounds, described above, have the function of modifying the surface tension of the resins in the melted state or modifying wetting of the surface of the pigments.

The simultaneous presence of different pigments results in the need to use, in many cases, different types of chemical compounds, often having properties which conflict with and neutralize each other.

If follows that the development of the colour mixture, resulting from mixing of the pigments, is subject to inconsistency from one preparation to the next due not only to the change in environmental conditions, which differ in each case, but also to the varying properties of the pigment surfaces which vary from batch to batch and the surface tension properties of the polymers in the melted state which, even though not differing from batch to batch, may be very different as a result of changes in the environmental conditions.

In the case of liquid paint formulations in solvent phase, introduction of the pigments is conventionally performed by mixing the pigments with resins dissolved in solvent.

The presence of solvent is extremely negative owing to its flocculating properties which tend to make the contact between resin and pigment unstable.

In order to reduce this effect, anti-flocculating chemical compounds are normally added to these mixtures of pigments and resins dissolved in a solvent, these having the property of modifying and adjusting the electrostatic properties of the surfaces of the pigments and modifying the surface tension of the resin/solvent solution.

Owing to these negative effects typical of the pigment/resin/solvent system, the colour mixtures may be defined as unstable systems where the chromatic effect of the finished paint changes over time.

Improvements to this system have been made by means of pre-dispersion techniques and corresponding pulverization of monopigment pastes, where the pigment is incorporated in particular resins, also of an aldehyde and ketone nature, but dissolved in solvent and using formulations of chemical compounds, in order to interface the surface of the specific pigment with the selected dissolved resin.

The aim of the present invention is to provide a coating which allows the drawbacks of the prior art to be overcome.

In connection with this aim, one object of the invention is to provide a coating in the form of a particle composition which may be used as a semifinished product for the colouring and pigmentation of powder paints or also used, after dissolving, in a solvent as a pigmented paste in the liquid paints industry.

Another object is that of providing a coating in granule or powder form which can be used to obtain mixtures of organic and inorganic dies for pigmenting powder and liquid paints, overcoming the difficulties which are typically encountered in the use of pigments according to the prior art.

In particular, the granular composition of the present invention may be used as a semifinished product in powder paint formulations, as an alternative to the pure pigments which are not pre-coated. With their use it is possible to achieve a greater uniformity in the quality of the colouring system and a reduction in the quantity of pigment originally used to promote the colouring potential which the pre-coated material possesses. The granular form, moreover, facilitates automated transportation of the material and reduces dust pollution.

The product resulting from this invention will be used as a semifinished product for the colouring and pigmentation of powder paints or also used, after dissolving in a solvent, as a pigmented paste in the liquid paints industry or as a component for tinting finished paints or also for pigmenting and therefore colouring both thermoplastic and thermosetting plastics (e.g. polyethylene, polypropylene, polyethylene terephthalate PET, acrylonitrile-butadiene-styrene ABS, as well as polyurethanes of varying composition, and reinforced and unreinforced polyamides of varying composition).

In particular, compared to the coatings known in the art, the granular composition of the present invention is completely dust-free, has a high pigmentation effect (with a consequent reduction in the cost of colouring), has optimum dispersion (i.e. no flocculation) and easy dissolution properties and is characterized by a high compatibility (i.e. may be used in different systems, such as for example in powder paints instead of in plastics).

These and other objects, which will appear more clearly below, are achieved by a coating of organic or inorganic pigments with aldehyde or ketone resins, characterized in that it comprises a chemical compound consisting of particles of solid organic and inorganic substances, both defined pigments, and aldehyde or ketone resins deposited on its surface.

The subject of the present invention therefore consists of a particle composition consisting of organic or inorganic pigments coated with at least one aldehyde and/or ketone resin, said resin having an average molecular weight of between 800 and 2000 Da and melting point of between 70° and 130° C.

The term "aldehyde and/or ketone resin" is understood as meaning a condensation product of an aldehyde (preferably aliphatic aldehyde) or a ketone (preferably cyclohexanone or methylcyclohexanone), optionally with condensation products such as urea or formaldehyde.

These resins are well-known in the sector of colouring agents and are normally used in powder paint formulations, by simple physical mixing of the resin granules with the pigments, or in liquid paint formulations in solvent phase, by mixing the pigments with resins dissolved in a solvent. Examples of aldehyde or ketone resins are, for example, the products distributed by BAF such as Laropal®, which is incorporated herein by way of reference; in particular, Laropal® A 101 and A 81 are condensation products of urea and aliphatic aldehydes while Laropal® K 80 is the condensation product of cyclohexanone.

According to a preferential aspect of the invention, the aldehyde and/or ketone have an average molecular weight of between 900 and 1400 Da and melting point of between 90° and 110° C.

The composition of the present invention normally comprises from 80% to 20% by weight of pigment and from 80 to 20% by weight of resin and may contain excipients and/or adjuvants such as mineral reinforcing fillers and/or dispersants. In the case of inorganic pigments, the composition preferably consists of 50 to 70% by weight of pigment and 35% to 45% by weight of resin, even more preferably 55 to 65% by weight of pigment and 35 to 45% by weight of resin; in the case of organic pigments, it preferably consists of 15 to 40% by weight of pigment, 45 to 75% by weight of resin, 1 to 20% by weight of mineral reinforcing fillers and 0.1 to 10% by weight of dispersants, even more preferably 20 to 35% by weight of pigment, 50 to 70% by weight of resin, 5 to 15% by weight of inert fillers and 1 to 7% by weight of dispersants. From among the mineral reinforcing fillers, barium sulphate is preferably used; the dispersants may be selected from among epoxidized soybean oils and sorbitan esters; preferably ethoxylated sorbitan ester, marketed by Uniqema as Atmer 116™, is used.

The composition in question may be in the form of powder or granules. In the first case, the particles of powder may have dimensions of between 10 and 100μ; in the second case, the granules may have a length of between 0.2 and 8.8 mm and diameter of between 0.4 and 2.2 mm, preferably a length of between 1.8 and 2.2 mm and diameter of between 1.0 and 1.8 mm; according to one of the possible embodiments of the invention, the composition contains, 80 to 1000 granules per gramme thereof.

The particle formulation according to the present invention may be produced by means of a method, the first two steps of which are unvaried, irrespective as to whether the formulation is the form of granules rather than powder.

The pigment is mixed with the resin inside a container suitable for mixing powders and granulates.

The present invention includes all those organic and inorganic powders which may be defined as colouring pigments or substances which absorb part or all of the light spectrum and reflect the complementary part thereof, forming the visible colour.

The pigments tested, according to the invention, are listed below.

Iron oxide pigments, in all their shades of yellow, brown, red and black; in all their physical forms and grain categories.

Titanium oxide pigments in all the different inorganic surface treatments.

Chromium oxide pigments also co-precipitated with nickel and nickel titanates.

Black pigments from organic combustion.

Blue and green pigments derived from copper phthalocyanine, also chlorinated and brominated, in the various alpha, beta and epsilon crystalline forms.

Yellow pigments derived from lead sulphochromate.

Yellow pigments derived from lead bismuth vandate.

Orange pigments derived from lead sulphochromate molybdate.

Yellow pigments of an organic nature based on arylamides.

Orange pigments of an organic nature based on naphthol.

Orange pigments of an organic nature based on diketo-pyrrolo-pyrrole.

Red pigments based on manganese salts of azo dyes.

Red pigments based on manganese salts of beta-oxynaphthoic acid.

Red organic quinacridone pigments.

Red organic anthraquinone pigments.

The research work, which was intended to identify from among the various polymers which may be used those suitable for obtaining this pigment coating, resulted in the families of aldehyde and ketone resins with a molecular weight of between 800 and 2000 and with a melting point of between 70° and 130° C.

The present invention relates preferably to the 100% use of polymers which, at the temperature of 20° C., are in the solid state.

The present invention covers all those mixtures of those pigments with these resins where the relative ratio of pigment and resin is between 80 and 20% and vice versa.

The prepared mixture is introduced into a heated-chamber extruder.

The present invention also relates to the use of single-screw and twin-screw extruders.

The extrusion is preferably performed at an internal temperature of the extruder 5-20° C. higher than the melting temperature of the aldehyde or ketone polymer used.

The melted material leaving the extruder is preferably cooled on a cooling belt and spread using cooled steel cylinders.

In the case of the powder formulation, the material is cooled to below 25° C. and then flaked by means of an ordinary pin-type flaking machine.

Then the material, in the form of flakes, is atomized using different mechanical systems including pin crushers.

An essential condition which characterizes and distinguishes the semifinished product is that the atomization operation is performed using cryogenic systems suitable for operation at operating temperatures of less than 10° C.

The transformation into atomized particles must take place at a temperature of below 20° C. so that fracturing of the structure of the melted and resolidified resin is performed, but leaving both the organic and the inorganic pigment completely coated.

The atomization operation envisages the introduction of anti-caking agents and flow agents, such as silicon oxide and aluminium oxide powders, in an amount equal to less than 0.2%.

The material leaving the atomization system will undergo grading so as to produce a standardized granulometric distribution curve which is not in any case exceptional, for the purposes of the present invention.

The graded material is then boxed for final use, thereby forming the object of the present invention.

In the case of a granular formulation, on the other hand, the melted material leaving the extruder is conveyed into a die from where it is drawn with a constant cross-section and is cooled and granulated by means of a wet method using a water jet cutting action. Preferably the granules are produced by means of a water jet cutting granulator of the type produced by Gala Industries Inc. and described in international patent application WO 01/21371, incorporated herein by way of reference.

Drying of the granules may be performed by means of simple ventilation and also may be speeded up using centrifuges and filtration; in the preferred embodiment of the invention, in the case where the granulation step is performed by means of the abovementioned water jet cutting granulator, the granules are separated by the water on a vibrating screen and then dried on a spiral elevator.

According to a further aspect of the invention, the granule formulation thus obtained may be transferred to the atomization stage in order to produce a powder formulation.

In particular, in the case of formulations based on organic pigments, an aqueous solution of the dispersant is prepared (the water is preferably used in a quantity of between 10 and 20% relative to the total weight of the formulation); the resin is introduced into the mixer and is wetted with a quantity of about 50% of said solution; the pigment is introduced during mixing and the remaining amount of aqueous solution is added; the inert filler is added and, after mixing, the product is discharged and then transferred to the extruder.

Mixing, both in the case of organic pigments and in the case of inorganic pigments, is normally performed at a speed of between 800 and 2200 rpm.

Use of the Invention in Powder Paints

The coating according to the present invention may be advantageously used in powder paint formulations, as an alternative to pure pigments which are not pre-coated.

Their use ensures a more uniform quality of the colouring system and a reduction in the quantity of pigment originally used to promote the colouring potential which the pre-coated material possesses.

It is left to the technical expertise of the person using it to determine the exact amounts and the correct use of the specific pre-coated pigment for the end use for which the painting product is intended.

Use of the Invention in Liquid Paints

The coating according to the present invention may be advantageously used in formulations of liquid solvent paints, after dilution in solvent or dilution in resins pre-diluted in a solvent.

The pre-dilution methods may be direct, such as mixing with helical vanes as well as energy transfer by means of an increase in the specific surface area and using balls of a varying nature and size.

The pastes thus obtained may form semifinished products suitable for the production of liquid solvent paints.

The coating, according to the present invention, may be used without pre-dilution either in a solvent or in a resin dissolved in solvent for colouring or tinting (modifying colours) by means of simple addition to paints and corresponding dissolving both using direct means, such as helical vanes, and by means of energy transfer via an increase in surface area and using balls of varying nature and size.

The coating according to the present invention is preferably used in formulations containing a monopigment and may be lined with aldehyde and ketone resins in the weight ratios shown in FIG. 2, the molecular weight of which ranges between 800 and 2000 with the melting point between 70° and 130° C., as can be seen from FIG. 3.

The preparation process is such that this coating is obtained by means of extrusion of the resinous part onto the pigment using a hot process, at a temperature 5-20° C. higher than the polymer melting temperature and with cooling in a thin layer using a belt and cooling cylinder.

The process envisages atomization by means of cryogenic processes such that the transformation occurs below 20° C., with the result that atomization takes place by means of fracture of the structure of the melted and resolidified resin, leaving however the pigment, be it organic or inorganic, completely coated.

It has been found in practice that the invention fulfils the task and achieves the predefined objects.

It has in fact been possible to provide a coating which is able to make up for the lack of standardization of the elements which are added when melting the polymer of the powder paints, during extrusion in order to incorporate the solid pigments.

The coating according to the present invention allows the production of coloured powder paints, with a degree of uniform quality, which is no longer dependent upon the environmental conditions in which the process of incorporating the pigment in the resin is performed, but is only the result of parameters which can be managed by the actual extrusion process.

This means that the pre-coated pigment no longer has an influence with the wettability properties of its surface and that the surface tension of the resin is uninfluential for the purposes of the uniformity and chromatic formation of the pigment mixture.

With the coating according to the present invention it is possible to overcome all the difficulties described above since the pre-coated pigment has eliminated all the effects associated with its pigment surface and is practically ready to be used also by means of simple dispersion in a solvent or even better in a solution of resins dissolved in solvent.

Obviously, the materials used, as well as the dimensions, may be any depending on the requirements and the state of the art.

Use of the Invention in Plastics

The monochromatic granulate of pre-coated pigment may be used to colour the plastics, polyethylene, polypropylene, PET, ABS and polystyrene as well as polyurethane elastomers of various formulations. It may be used individually and mixed together in order to produce a given colour.

The metered mixture of various monochromatic granules allows composition of the final colour directly before the feeding step which converts the granules of plastic into the melted state for colouring and/or production of the final object.

In other words, the mixture of granules of different monochromatic colour allows the composition of a polychromatic colour by means of simple mixing. Hence it allows the composition of a colouring system based on monochromatic granules so as to obtain colours composed of various monochromatic pigments.

In the plastics sector, which this invention also embraces, hitherto master batches have been used for pigmentation and associated colouring.

These are mixtures of chromatic pigments with resin (similar to the resin used at the end), extruded and granulated.

These master batches, which are added in a small amount to the plastics before extrusion, pigment the mass of the plastic.

In some specific case of continuous and constant extrusions, always using the same material and same colour, it is possible to pigment the plastic by means of a liquid master batch where the pigment is pulverized in a liquid vehicle, such as plasticizers (polyacid esters).

The latter is fed onto the head of an extruder, before pigmentation by means of extrusion.

Never before has use been made of monopigment granules of pigments pre-coated with aldehyde or ketone resins, to be metered before the colouring extrusion of the plastic.

These granules may impart the final colour to the mass, without having to go through the complex preparation procedure involving finished-colour master batches.

The object of the present invention is that of allowing metering of the quantity of pigment already pre-pulverized and rendering less harmful handling of the original pigments.

Moreover, owing to the great molecular mobility of the aldehyde or ketone resin based coating, it is possible to achieve the uniform colouring, with monochromatic semifinished products and with the granulates according to the present invention, of plastics, of powder paints and liquid paints.

Further characteristic features and advantages of the subject of the present invention will emerge more clearly from an examination of the description of a preferred, but not exclusive embodiment of the invention, illustrated by way of a non-limiting example in the accompanying drawings in which.

Figure 1A:
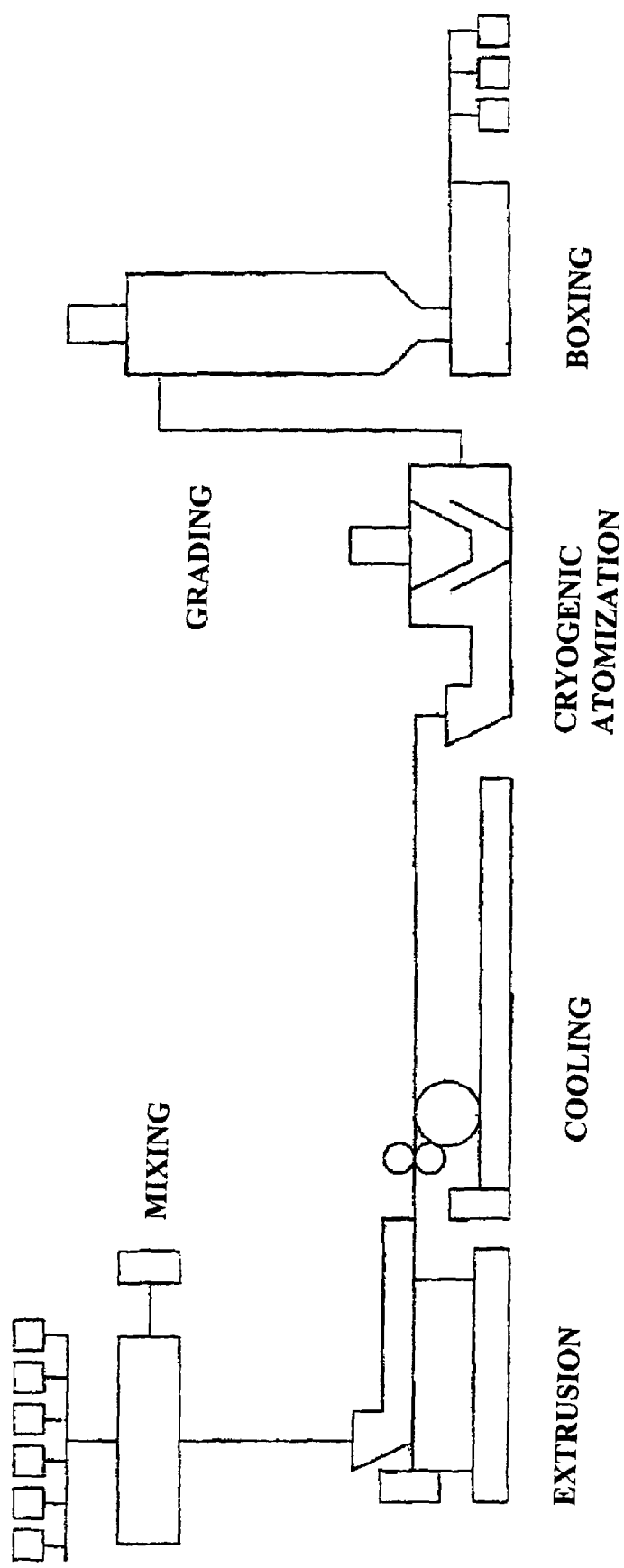
FIG. 1a shows a diagram of a possible plant for the production of the powder coating according to the present invention.
Figure 1B:
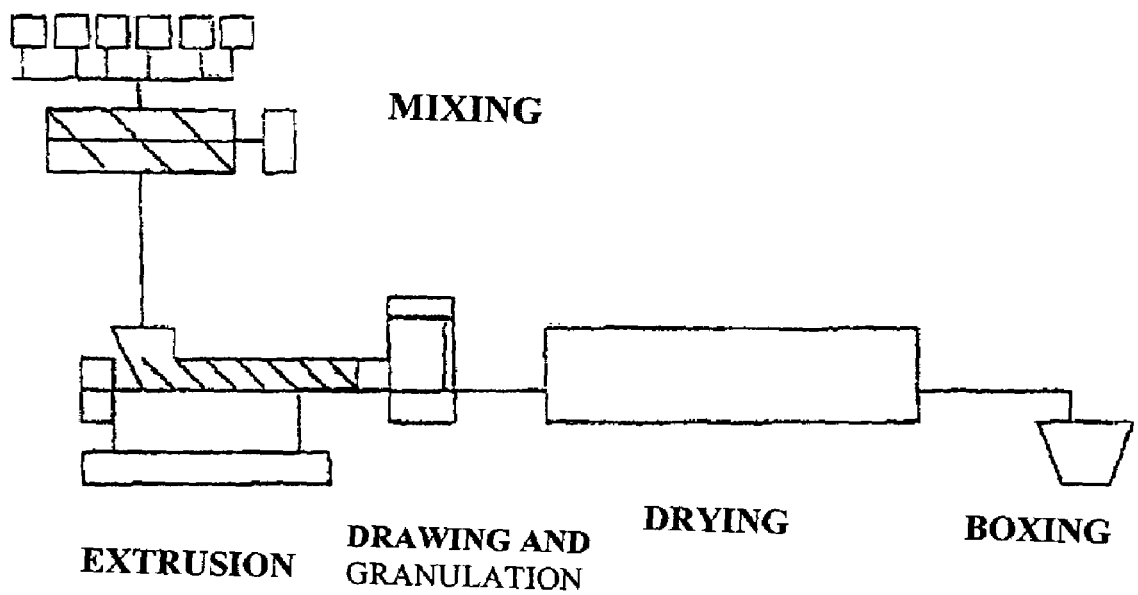
FIG. 1b shows a diagram of a possible plant for the production of the granule coating according to the present invention.
Figure 2:
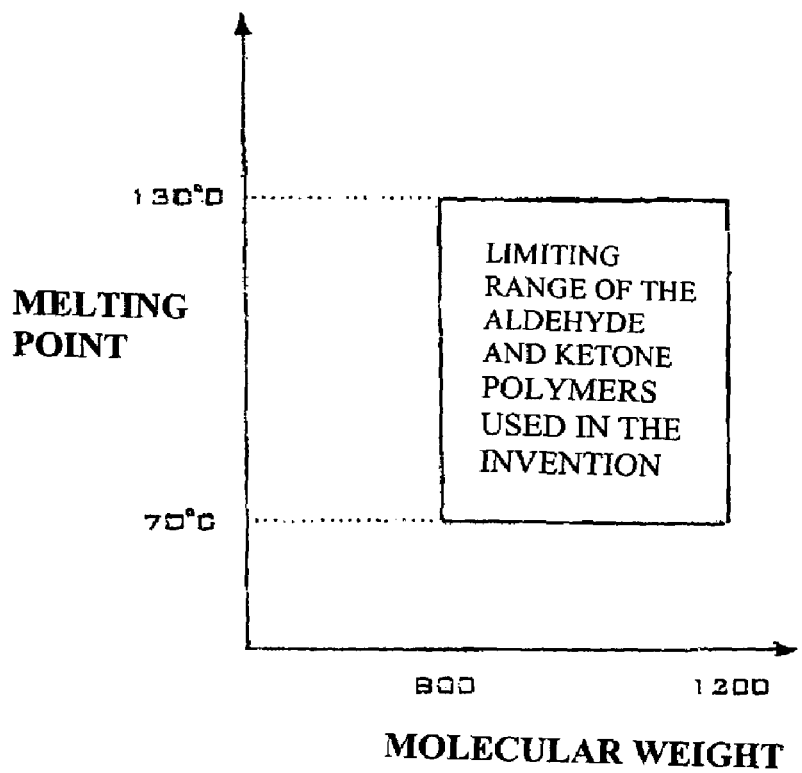
FIG. 2 is a diagram illustrating the range of use of the coating according to the invention.
Figure 3:
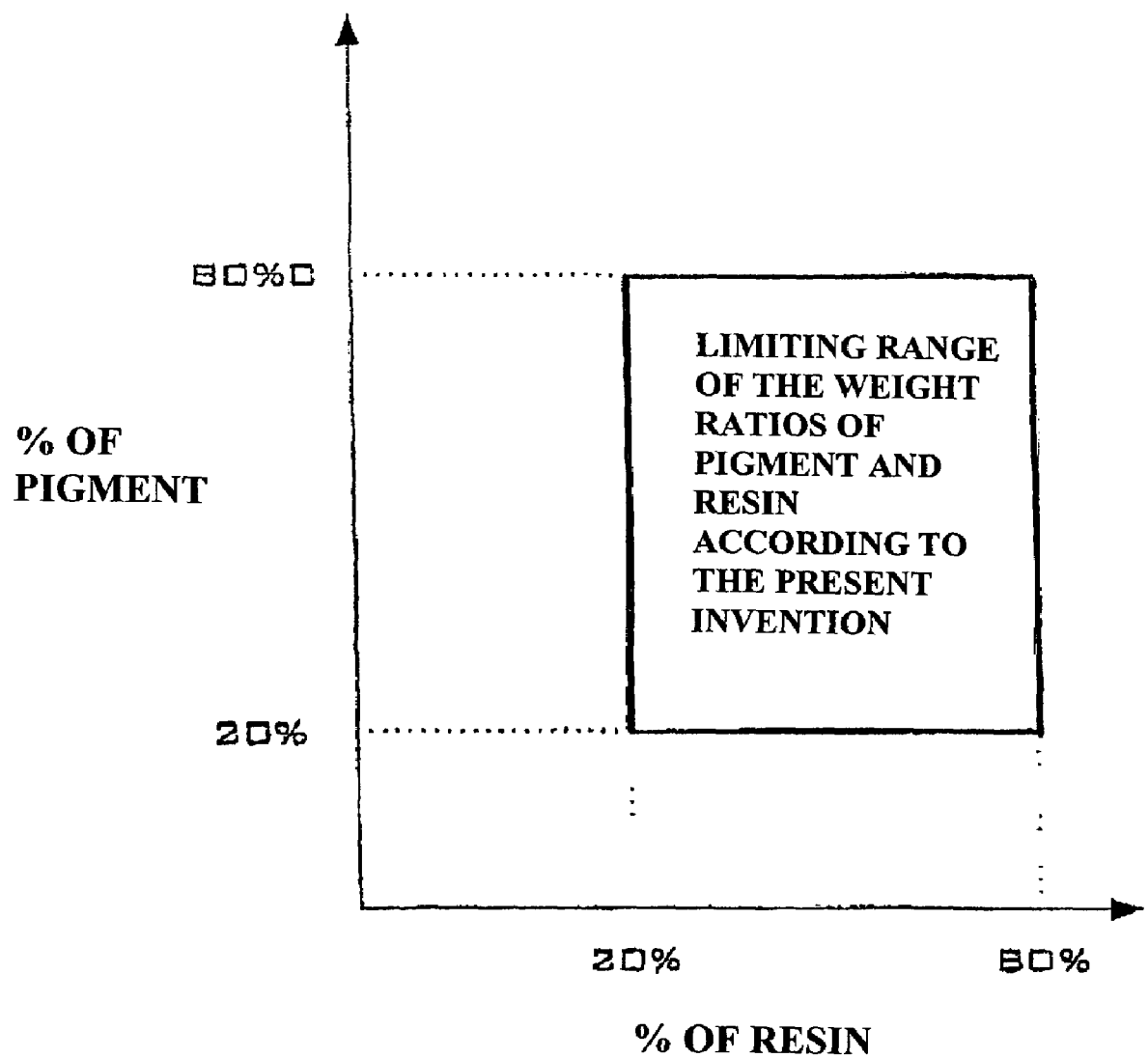
FIG. 3 is a diagram illustrating the relative ratio of pigment and resin in the mixtures of the coating according to the present invention.

The examples which follow have a purely illustrative and non-limiting function and identify some of the possible mixtures of compounds to be conveyed to the extruder in order to produce subsequently the particle compositions of the invention in both granule and powder form; water must obviously not be regarded as a component of the final formulation since it has been eliminated during drying, and the parts are to be regarded as by weight.

EXAMPLE 1 green pigment (based on copper phthalocyanine) 30
barium sulphate 10
atmer 116 5
laropal A 81 55
water 12

EXAMPLE 2 black pigment (carbon black) 25
barium sulphate 10
atmer 116 2
laropal A 81 63
water 14

EXAMPLE 3 yellow pigment (based on copper phthalocyanine) 60
laropal A 81 40

EXAMPLE 4 blue pigment (based on iron phthalocyanine) 30
laropal A 81 70

The invention claimed is:

1. Particle composition consisting of pigments coated with at least one aldehyde and/or ketone resin, said resin having an average molecular weight of between 800 and 2000 Da and melting point of between 70° and 130° C., wherein the composition is in the form of granules having a length of between 1.8 and 2.2 mm and a diameter of between 1.0 and 1.8.

2. Composition according to claim 1, characterized in that said resin has an average molecular weight of between 900 and 1400 Da.

3. Composition according to claim 1, characterized in that said resin has a melting point of between 90° and 110° C.

4. Composition according to claim 1, characterized in that said aldehyde resin is the condensation product of aliphatic aldehydes and urea.

5. Composition according to claim 1, characterized in that said ketone resin is the condensation product of cyclohexanone or methylcyclohexanone.

6. Composition according to claim 1, characterized in that said ketone resin is the condensation product of cyclohexanone or methylcyclohexanone with urea or formaldehyde.

7. Composition according to claim 1, characterized in that said pigments are chosen from among organic pigments and inorganic pigments.

8. Composition according to claim 7, characterized in that said pigments are chosen from among iron oxide pigments, titanium oxide pigments, chromium oxide pigments co-precipitated with nickel and nickel titanates, black pigments from organic combustion, blue and green pigments from copper phthalocyanine, yellow pigments from lead sulphochromate or lead bismuth vanadate, orange pigments from lead sulphochromate molybdate, yellow pigments based on arylamides, orange pigments based on naphthol, orange pigments based on diketo-pyrrolo-pyrrole, red pigments based on manganese salts of azo dyes, red pigments based on manganese salts of beta-oxynaphthoic acid, red pigments based on quinacridone, and red pigments based on anthraquinone or mixtures thereof.

9. Composition according to claim 1, characterized in that it contains from 80 to 20% by weight of said pigment and from 80 to 20% by weight of said resin.

10. Composition according to claim 9, characterized in that it consists of 80 to 20% by weight of inorganic pigment and 80 to 20% by weight of resin.

11. Composition according to claim 10, characterized in that it consists of 55 to 65% by weight of inorganic pigment and 35 to 45% by weight of said resin.

12. Composition according to claim 9, characterized in that it consists of 15 to 40% by weight of organic pigment, 45 to 75% by weight of resin, 1 to 20% by weight of mineral reinforcing filler and 0.1 to 10% by weight of dispersants.

13. Composition according to claim 12, characterized in that it consists of 20 to 35% by weight of organic pigment, 50 to 70% by weight of resin, 5 to 15% by weight of mineral reinforcing filler and 1 to 7% by weight of dispersants.

14. Composition according to claim 12, characterized in that said mineral reinforcing filler is barium sulphate.

15. Composition according to claim 12, characterized in that said dispersants are chosen from among epoxidized soybean oils and sorbitan esters.

16. Composition according to claim 1, characterized in that it contains from 80 to 1000 granules per gram of composition.

17. Use of the composition according to claim 1, for the preparation of powder paints, liquid paints and plastics.

18. A process for the preparation of a granule composition according to claim 1, comprising melting of the resin, wetting of the entire surface of the pigment with the melted resin, extrusion of the mixture thus obtained, cooling thereof and subsequent granulation in the wet state and drying.

19. A process for the preparation of a powder composition according to claim 1, comprising melting of the resin, wetting of the entire surface of the pigment with the melted resin, extrusion of the mixture thus obtained, cooling thereof and subsequent atomization thereof at temperatures of less than 10° C.

20. A process according to claim 18, characterized in that extrusion is performed at an internal temperature of the extruder 5 to 20° C. higher than the melting temperature of the resin.

21. A process according to claim 19, characterized in that extrusion is performed at an internal temperature of the extruder 5 to 20° C. higher than the melting temperature of the resin.

22. A process according to claim 18, characterized in that it comprises the use of single-screw and twin-screw extruders.

23. A process according to claim 19, characterized in that it comprises the use of single-screw and twin-screw extruders.

24. A process for the preparation of a powder composition according to claim 19, characterized in that the cooling is performed on a belt spread using cooled steel cylinders.

25. A process for the preparation of a powder composition according to claim 19, characterized in that the material cooled is flaked before undergoing atomization.

26. A process for the preparation of a powder composition according to claim 19, characterized in that the material in the form of flakes is atomized using various mechanical systems including pin crushers.

27. A process for the preparation of a powder composition according to claim 19, characterized in that the atomization is performed below 20° C.

28. A process for the preparation of a powder composition according to claim 19, characterized in that atomization is performed in the presence of anti-caking agents and flow agents.

29. A process for the preparation of a granule composition according to claim 19, characterized in that the melted material leaving the extruder is cooled and granulated using a wet method with a water jet cutting action.

30. A process for the preparation of a granule composition according to claim 29, characterized in that the granules are separated by the water on a vibrating screen and then dried on a spiral elevator.

31. A process according to claim 18 comprising a granule atomization step.

32. A process according to claim 29, comprising a granule atomization step.

33. A process according to claim 30, comprising a granule atomization step.

34. Composition according to claim 10, characterized in that it consists of 50 to 70% by weight of inorganic pigment.

35. Composition according to claim 10, characterized in that it consists of 30 to 50% by weight of resin.

36. Composition according to claim 15, characterized in that said dispersants are epoxylated sorbitan esters.

37. A process according to claim 22, characterized in that it comprises the use of single-screw and twin-screw extruders of the heated chamber type.

38. A process according to claim 23, characterized in that it comprises the use of single-screw and twin-screw extruders of the heated chamber type.

39. A process for the preparation of a powder composition according to claim 25, characterized in that the material cooled is cooled below 25° C.

40. A process for the preparation of a powder composition according to claim 28, characterized in that the anti-caking and flow agents comprises aluminum oxide and silicon oxide powders in an amount less than 0.2% by weight.

* * * * *